US007246719B2

(12) United States Patent
Mason, II et al.

(10) Patent No.: US 7,246,719 B2
(45) Date of Patent: Jul. 24, 2007

(54) ADJUSTABLE STORAGE RACK FOR A VENDING MACHINE

(75) Inventors: Paul L. Mason, II, Inwood, WV (US); David A. Sprankle, Hagerstown, MD (US)

(73) Assignee: Automated Merchandising Systems Inc., Kearneysville, WV (US)

(*) Notice: Subject to any disclaimer, the term of this patent is extended or adjusted under 35 U.S.C. 154(b) by 0 days.

(21) Appl. No.: 11/008,100

(22) Filed: Dec. 10, 2004

(65) Prior Publication Data

US 2005/0189374 A1 Sep. 1, 2005

Related U.S. Application Data

(60) Provisional application No. 60/528,703, filed on Dec. 12, 2003.

(51) Int. Cl.

| | |
|---|---|
| ***B65H 31/20*** | (2006.01) |
| ***B65H 1/00*** | (2006.01) |
| ***G07F 11/16*** | (2006.01) |
| ***G07F 11/68*** | (2006.01) |
| ***B65G 59/00*** | (2006.01) |

(52) U.S. Cl. ........................ 221/241; 221/242; 221/92; 221/312 R; 312/45; 312/42; 312/72

(58) Field of Classification Search ................ 221/241, 221/242, 92, 312 R, 67, 312; 312/72, 45, 312/42

See application file for complete search history.

(56) References Cited

U.S. PATENT DOCUMENTS

| | | | | |
|---|---|---|---|---|
| 2,272,682 | A * | 2/1942 | Srodulski | 312/42 |
| 2,836,326 | A | 5/1958 | Childers | |
| 3,145,066 | A * | 8/1964 | O'Neal | 312/45 |
| 3,158,247 | A * | 11/1964 | Gale | 194/201 |
| 3,221,637 | A * | 12/1965 | Small et al. | 99/289 R |
| 3,361,506 | A * | 1/1968 | Newberry | 312/45 |
| 3,757,998 | A | 9/1973 | Millies | |
| 3,883,038 | A * | 5/1975 | Bookout | 221/67 |
| 4,331,261 | A * | 5/1982 | Brown | 221/232 |
| 4,424,194 | A * | 1/1984 | Hughes | 423/1 |
| 4,509,658 | A * | 4/1985 | Oden | 221/115 |
| 4,511,060 | A * | 4/1985 | Lindsey | 221/115 |
| 5,540,315 | A | 7/1996 | Haiki | |
| 5,570,811 | A | 11/1996 | Wittern, Jr. | |
| 5,713,490 | A | 2/1998 | Oden | |
| 5,791,516 | A | 8/1998 | Wittern, Jr. | |
| 5,967,364 | A * | 10/1999 | Swanson et al. | 221/6 |
| 6,116,462 | A * | 9/2000 | Takamura et al. | 221/241 |
| 6,264,060 | B1 | 7/2001 | Podgorny | |
| 6,409,045 | B1 | 6/2002 | Lauer | |
| 6,523,725 | B1 * | 2/2003 | Paczkowski et al. | 222/241 |

* cited by examiner

FOREIGN PATENT DOCUMENTS

JP 2001351161 A * 12/2001

OTHER PUBLICATIONS

International Search Report and Written Opinion mailed Jan. 5, 2007 in corresponding International Application No. PCT/US2004/041182.

*Primary Examiner*—Gene O Crawford
*Assistant Examiner*—Rakesh Kumar
(74) *Attorney, Agent, or Firm*—Davidson Berquist Jackson & Gowdey, LLP

(57) ABSTRACT

A vending machine includes at least one width-adjustable storage rack, the storage rack having a fixed wall and a movable wall connected to the fixed wall by at least one connecting link; and an adjustment mechanism constructed and adapted to position the movable wall relative to the fixed wall and to thereby vary an interior width between the fixed and movable walls. Two movable walls can be connected to a single fixed wall.

20 Claims, 10 Drawing Sheets

ADJUSTABLE STORAGE RACK FOR A VENDING MACHINE

This application is related to and claims priority from U.S. Provisional Patent Application No. 60/528,703, titled “Adjustable Storage Rack,” filed Dec. 12, 2003, the contents of which are incorporated herein.

FIELD OF THE INVENTION

The present invention relates to a storage rack for use in a vending machine, and more particularly, to a storage rack for use in a beverage vending machine.

BACKGROUND

Beverage vending machines are presently used to vend a variety of different kinds of beverages packaged in a variety of different containers having different shapes and sizes. These beverage vending machines typically have a plurality of vertical storage racks for storing the beverage containers waiting to be vended. Such a storage rack has two fixed vertical walls spaced apart a distance greater than the diameter of the largest container expected to be vended in the machine, i.e., sufficient to hold the largest container expected to be vended by the machine. However, such a spacing can be too large for smaller diameter containers, which can hinder proper vending of the smaller containers.

In the past, attempts to deal with this problem included placing spacer shims in the storage rack to reduce the relative distance between the two fixed walls (interior width) and to thereby allow easier vending of smaller containers. By the use of shims having different thicknesses or the use of multiple shims, the interior width can be reduced as desired for different sized containers. However, the use of shims can be problematic. Shims must be stored in the vending cabinet when not in use or they are prone to loss. They can slip from their desired position and hinder the vending of the containers. They can be tricky to install and adjust properly. Multiple shims must be kept available to accommodate differently sized beverage containers.

The present invention provides a storage rack that is adjustable for differently sized containers.

BRIEF DESCRIPTION OF THE DRAWINGS

The invention will now be described in greater detail with reference to the following drawings in which.

DETAILED DESCRIPTION OF THE PRESENTLY PREFERRED EXEMPLARY EMBODIMENTS

Figure 1:
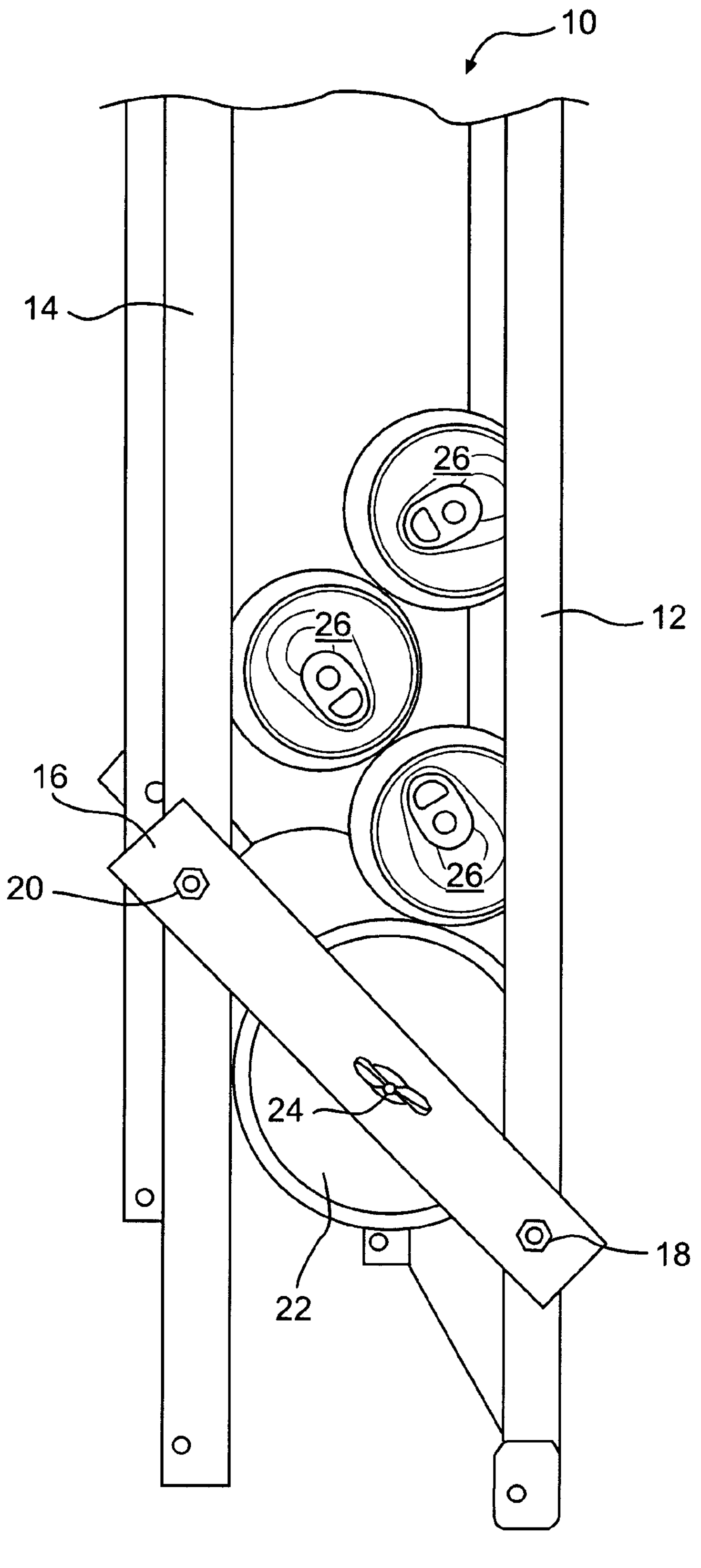
FIG. 1 is a partial front perspective view of an adjustable storage rack according to embodiments of the present invention, adjusted to a first interior width.

A first embodiment of an adjustable storage rack 10 according to the present invention is shown in FIGS. 1–5. The adjustable storage rack 10 includes a fixed wall 12 and a movable wall 14. The movable wall 14 is connected to the fixed wall 12 by a connecting link 16 pivotally attached to the fixed wall by a connector 18 and also pivotally attached to the movable wall 14 by a connector 20. The connectors 18 and 20 can be of several types, including threaded fasteners, pin and clip fasteners, rivets, etc. A conventional oscillator 22 (or like mechanism for extracting and vending the lowest product) for vending the beverage container (product) is connected to the connecting link 16 by a connector 24.

Figure 2:
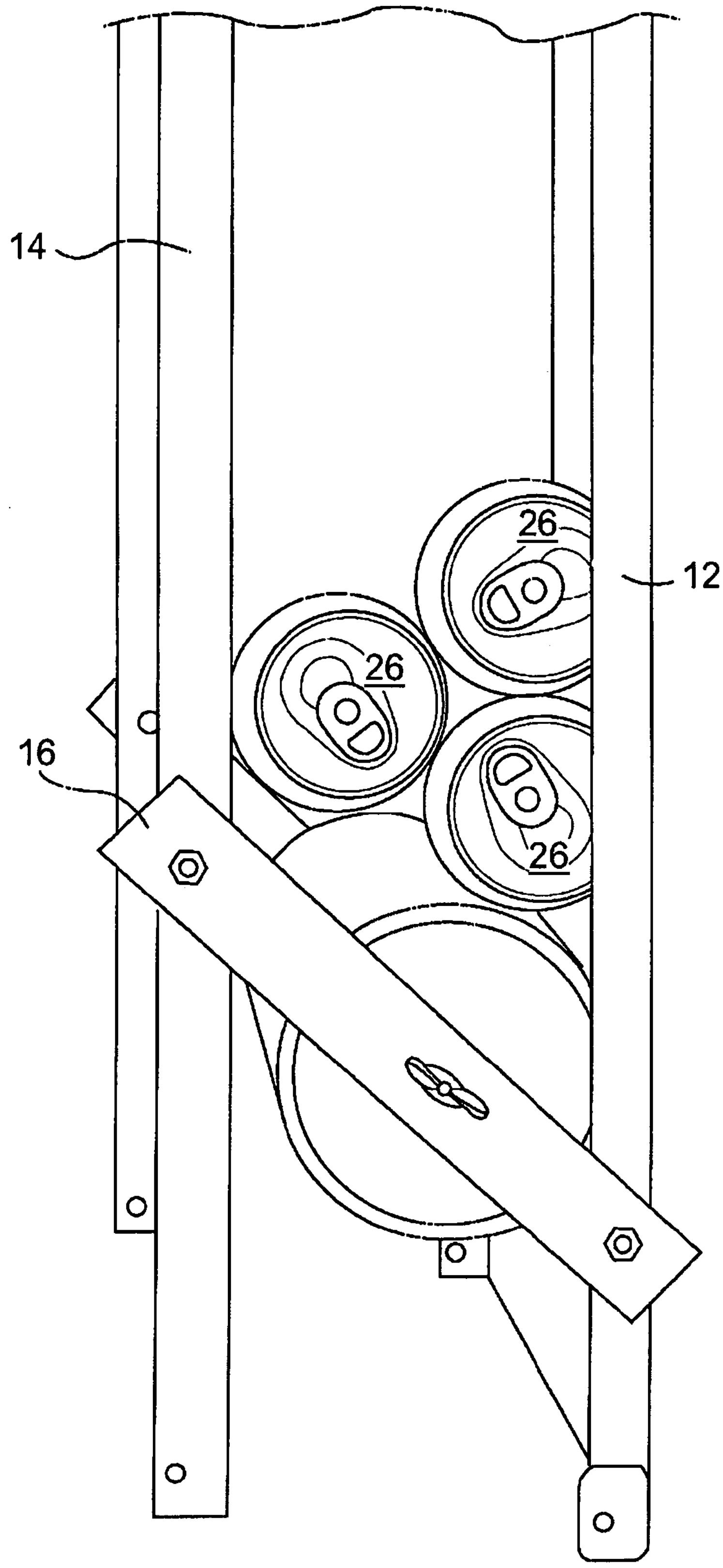
FIG. 2 is a partial front perspective view of the adjustable storage rack of FIG. 1, adjusted to a second interior width.
Figure 3:
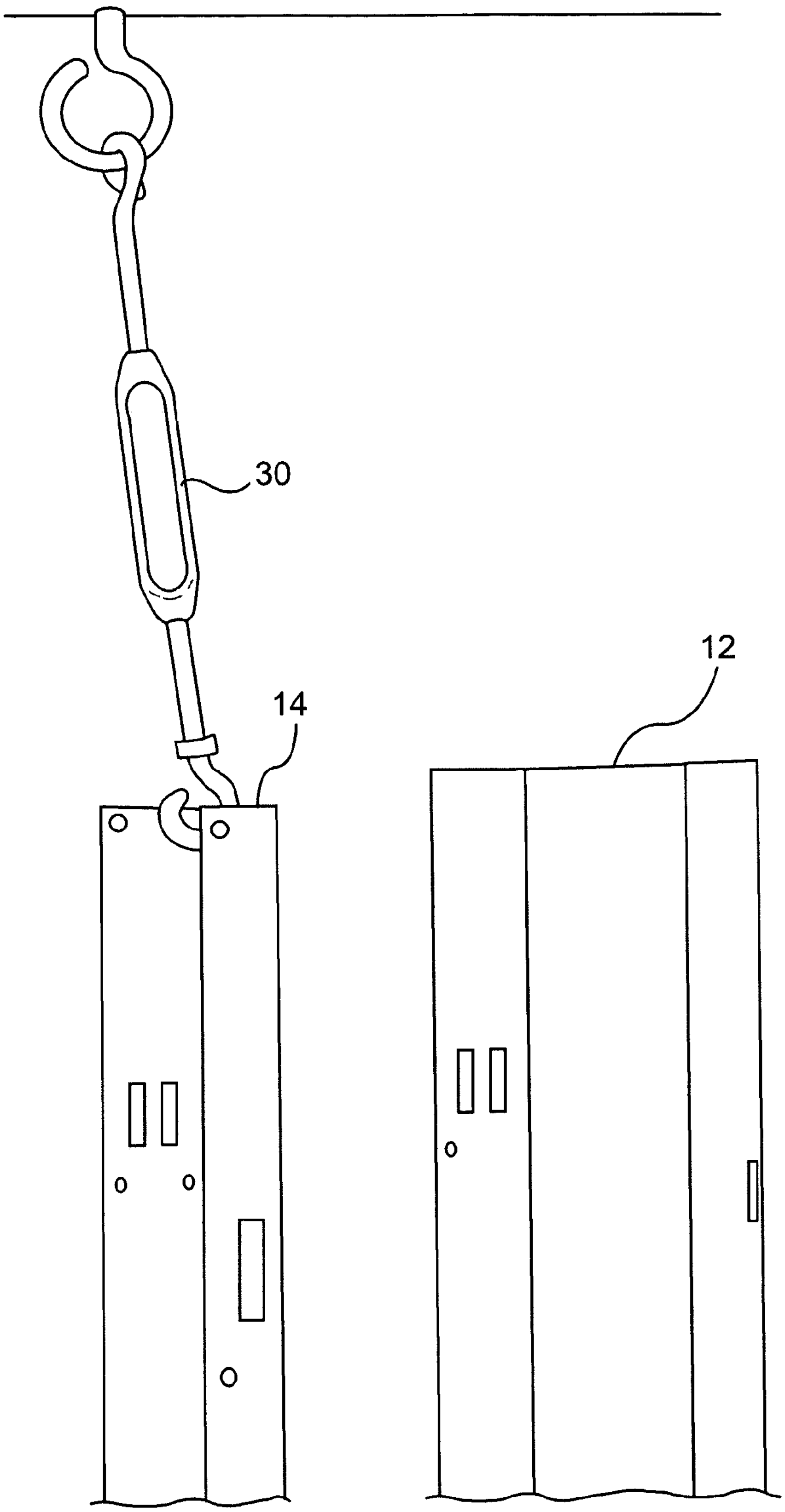
FIG. 3 is a front perspective view of an adjustment mechanism of the embodiment of FIG. 1.

The connecting link allows the movable wall 14 to move with respect to the fixed wall 12 and to thereby vary the interior width between the movable wall 14 and the fixed wall 12, for example, as shown in FIGS. 1 and 2. As compared to its position in FIG. 1, the movable wall 14 in FIG. 2 has been vertically lowered with respect to the fixed wall 12, thereby increasing the interior width between the two walls, as can be seen by the different spacing of the containers 26 in the two drawings.

Adjustment of the movable wall 14 may be made in different manners. In the embodiment shown, with reference also to FIG. 3, a turnbuckle 30 (or like mechanism) attached between the movable wall 14 and a fixed point, e.g., on the vending machine housing, can be used to move the movable wall to a position that provides a desired interior width for the storage rack 10. By adjusting the length of the turnbuckle, the movable wall is raised or lowered to alter the interior width between the movable wall 14 and the fixed wall 12. The turnbuckle 30 may also be attached between the movable wall 14 and the fixed wall 12. Other mechanisms can also be used to adjust the distance between the two walls, including but not limited to, cam arrangements and link arrangements with discrete adjustment positions.

Figure 4:
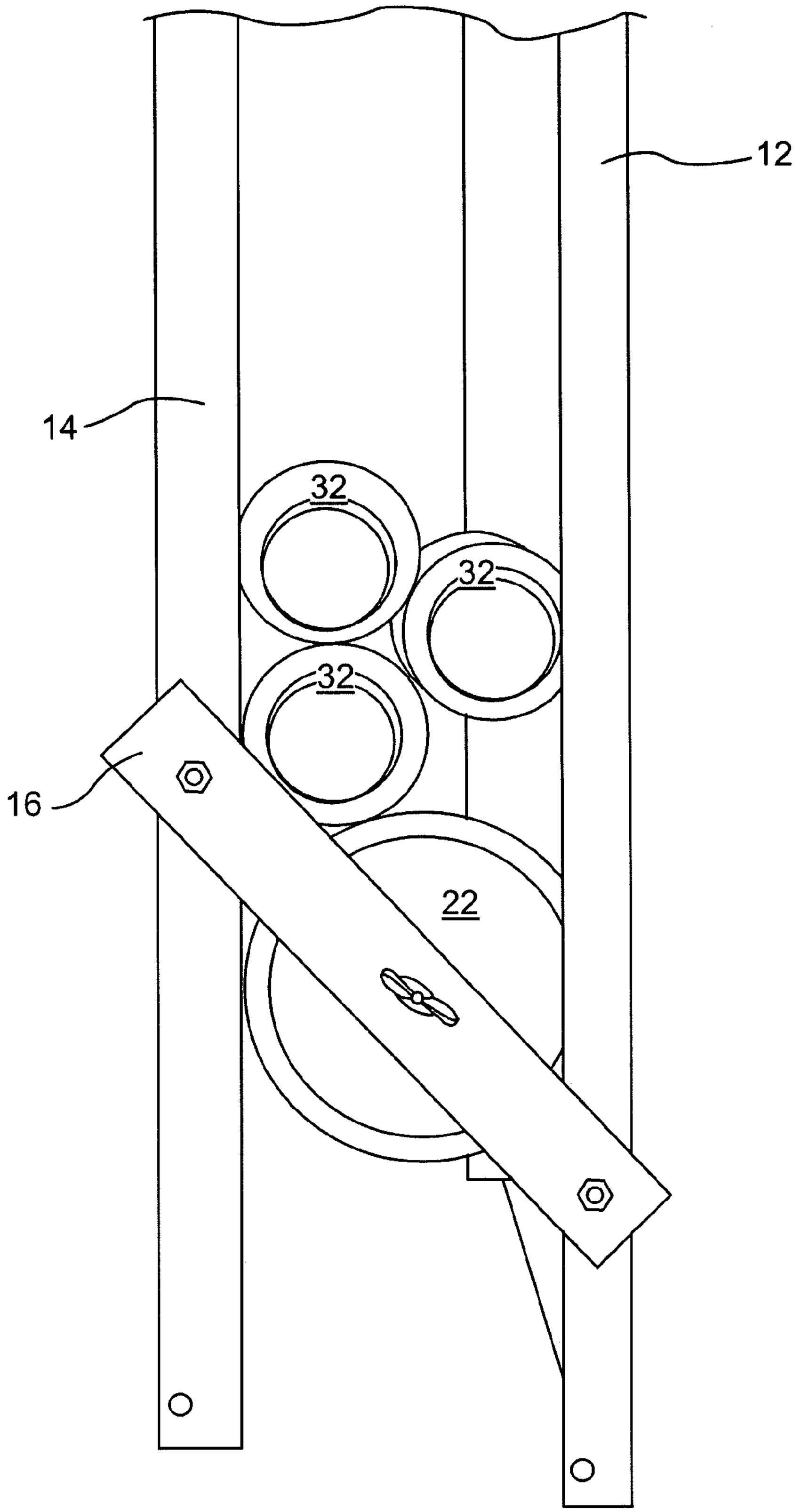
FIG. 4 is a partial front perspective view of the embodiment of FIG. 1, adjusted to a third interior width.
Figure 5:
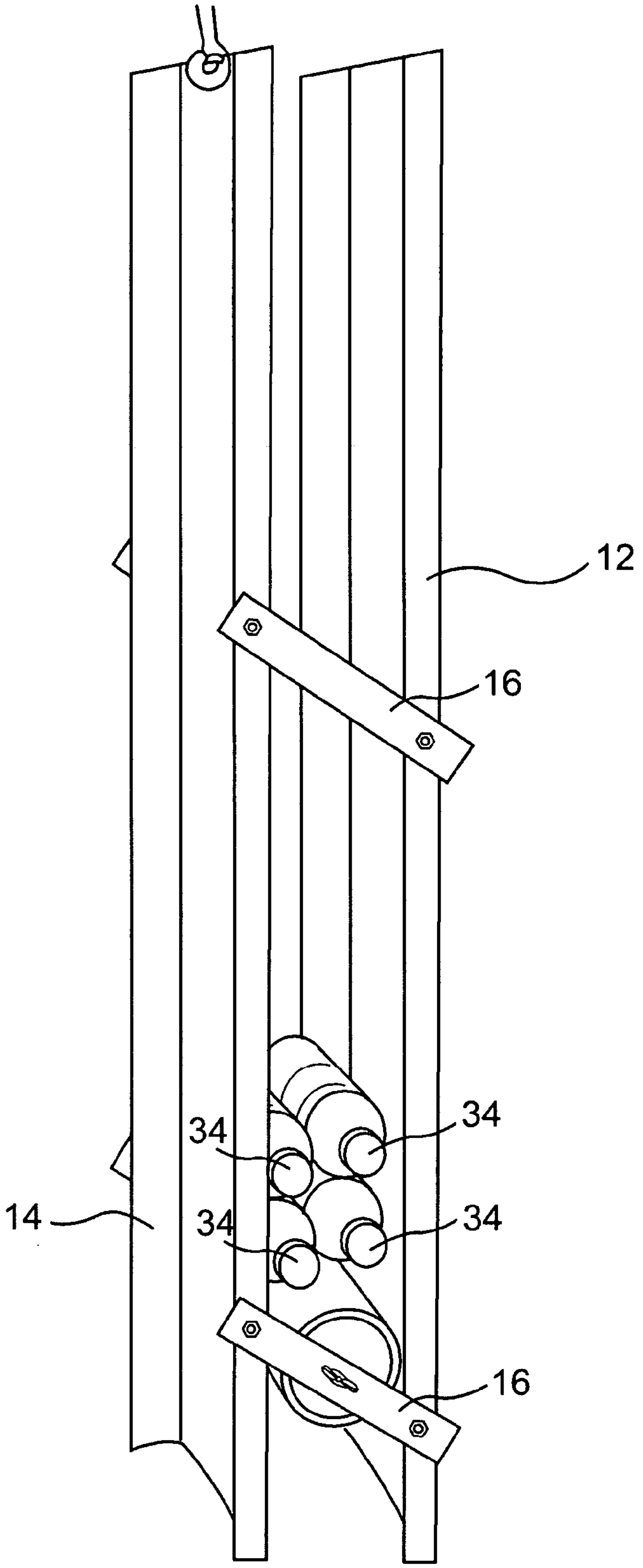
FIG. 5 is a front perspective view of the embodiment of FIG. 1, adjusted to a fourth interior width.

FIGS. 4 and 5 show the storage rack 10 adjusted for width to better accommodate differently sized beverage containers 32 and 34.

In this embodiment, by mounting the oscillator 22 in the center of the connecting link 16, it is kept approximately centered in the rack 10 regardless of the spacing between the two walls. (In the example shown in FIG. 1, the center of the connecting link will only be at the center of the column formed by the two walls when the link is horizontal. In other positions of the link 16, its center—and therefore the oscillator connected thereto—will be off-center with respect to the column formed by the two walls.) In some embodiments, the oscillator 22 is connected to the link 16 in such a way as to always center it between the walls. Although only one connecting link 16 is shown in FIGS. 1 and 2, it should be understood that there will be a counterpart connecting link 16 on the rear side of the rack 10 and there may also be other corresponding pairs of connecting links 16 attached between the fixed and movable walls at different positions along the height of the walls, e.g., as shown in FIG. 5 which shows the use of four connecting links 16, two in the front of the rack, and two in the rear. The number of connecting links can be altered as desired. The links can be set to maintain the movable wall 14 parallel to the fixed wall 12 throughout the range of adjustment, however, it is not necessary that the side walls 12 and 14 remain parallel.

For instance, in an alternative embodiment, the connecting links 16 may only be used at the bottom of the rack 10. The top of the rack walls would be located by a vertical slot and a pin riding in the slot. As the movable wall 14 is moved up and down (using the turnbuckle 30 or other device) the interior width at the top of the rack 10 would be maintained but the interior width at the bottom of the rack 10 would grow or shrink (depending on which way the movable wall 14 is moved). In another embodiment, the top connecting links 16 can be made nearly horizontal. When adjusting, the bottom interior width would grow or shrink but the top interior width would remain nearly the same.

Figure 6:
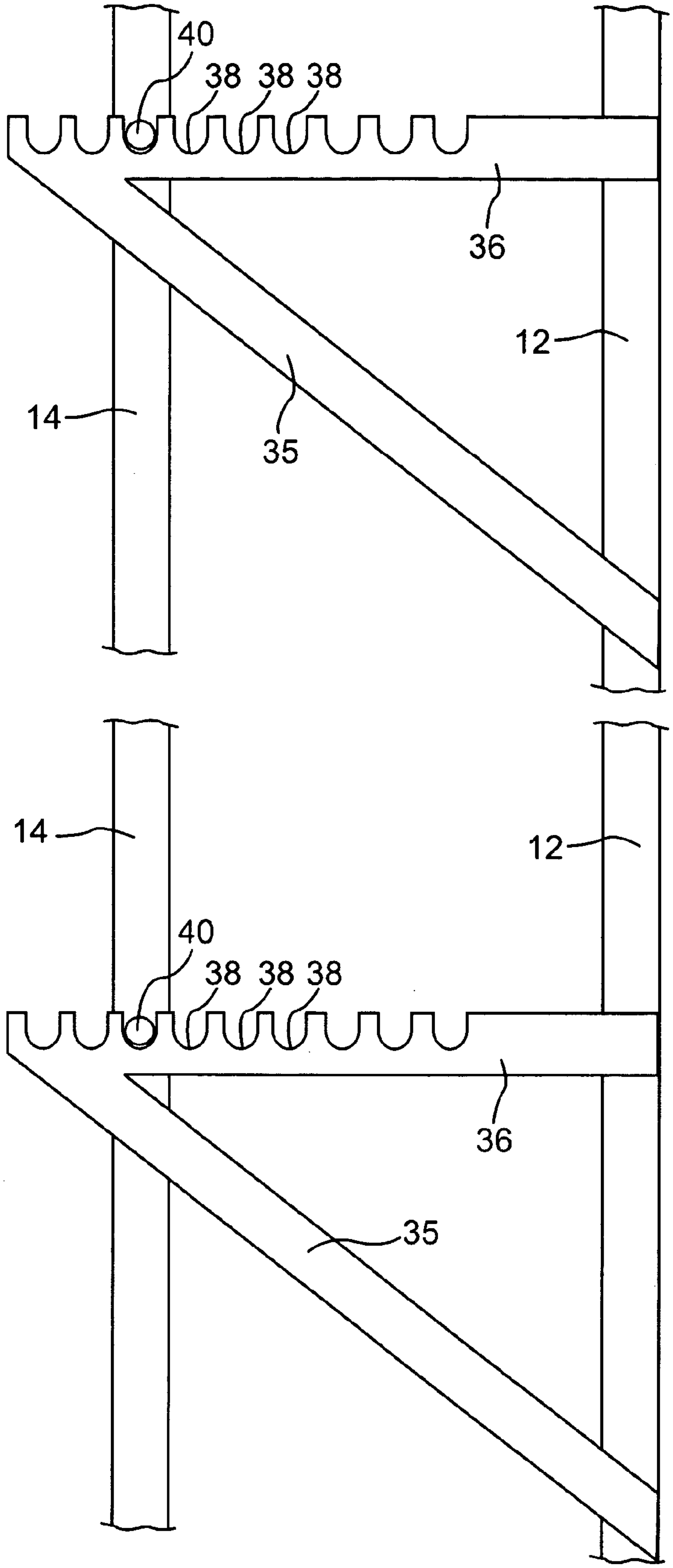
FIG. 6 is a front elevational view of a second embodiment of an adjustable storage rack according to the present invention.

In an alternative embodiment shown in FIG. 6, the adjustment of the movable wall 14 is performed differently. Here, a pair of brackets 35 are attached to the fixed wall 12. Each bracket 35 includes an adjustment link 36 having a plurality of spaced apart adjustment slots 38, each constructed and arranged to receive a pin 40 attached to the movable wall 14. In this embodiment, the movable wall 14 is adjusted by raising it to elevate the pins 40 out of the respective adjustment slots 38, moving the movable wall 14 to the desired distance from the fixed wall 12, and lowering the movable wall 14 so that the pins 40 engage the selected adjustment slots 38 to provide the desired interior width. The number of brackets 35 and pins 40 can be adjusted as desired. In a preferred embodiment, four brackets 35 and four pins 40 will be used for each movable wall 14. One skilled in the art will immediately realize that the brackets could be attached to the movable wall 14, with the pins on the fixed wall 12. In such embodiments, the adjustment slots will need to be on the underside of the link 36.

Figure 7:
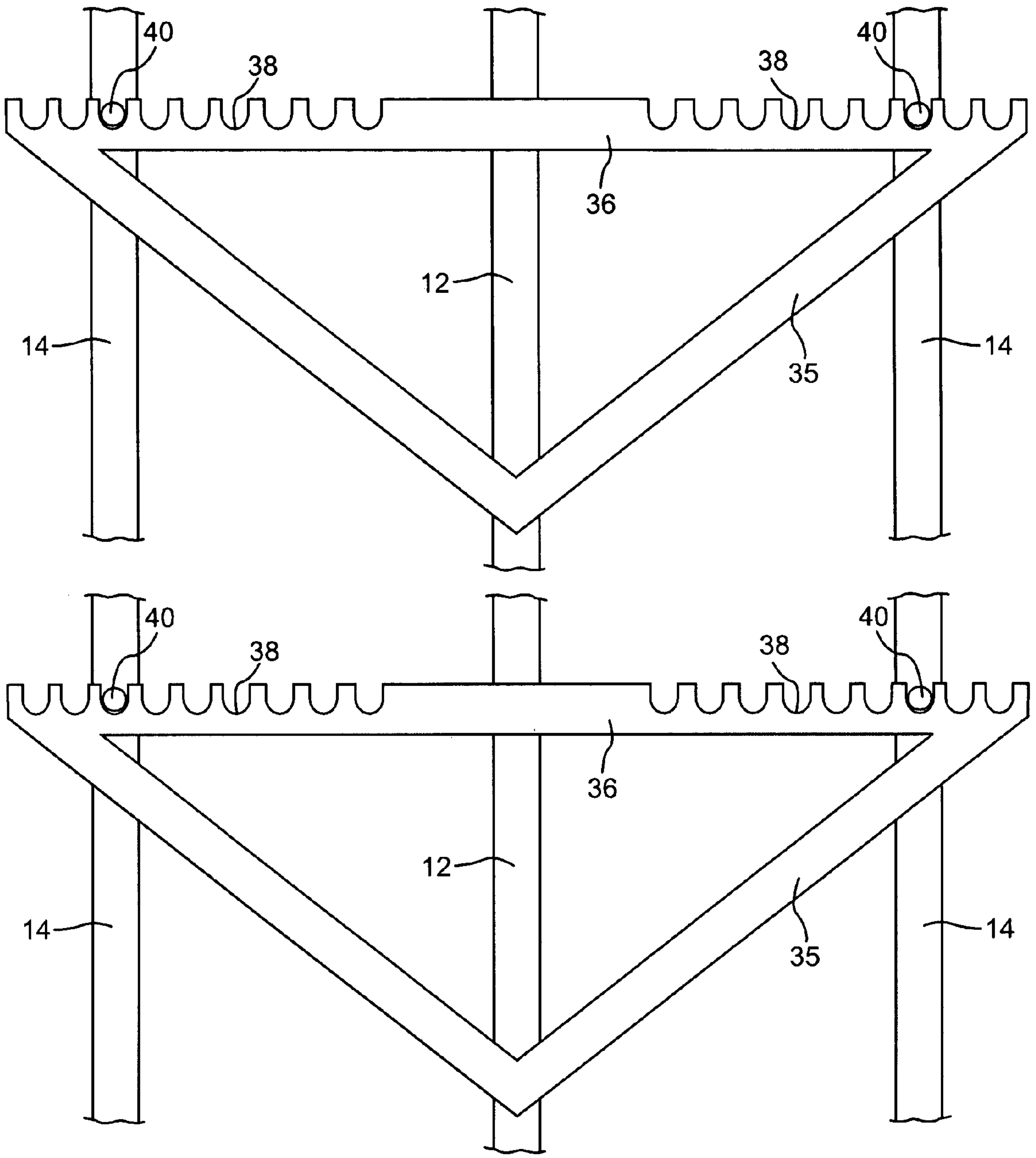
FIG. 7 is a front elevational view of a third embodiment of an adjustable storage rack according to the present invention.

In a further alternative embodiment, as shown, e.g., in FIG. 7, a central fixed wall 12 is flanked on both sides by two movable walls 14. Each of the two movable walls 14 is separately and independently adjustable from the other. With this type of embodiment, two separate adjustable storage racks can be constructed using only three walls, thereby providing a cost savings by omitting one fixed wall 12. In the embodiment shown in FIG. 7, each bracket 35 includes an adjustment link 36 that has two sets of adjustment slots 38 for the two counterpart movable walls 14.

The size, shape and spacing of the adjustment slots and pins 40 may be altered, as desired, to provide the desired strength and precision of adjustment that are required. An additional mechanism can be installed between the pin 40 and the movable wall 14 to adjust the positioning of the pin 40 with respect to the wall 14 so that a finer adjustment of the positioning of the wall 14 may be obtained than would otherwise be allowed by the pitch of the adjustment slots 38. Such a mechanism could, e.g., be a threaded mechanism that allows fine adjustment by turning the threaded component.

In the embodiments shown in FIGS. 6 and 7, the movable wall 14 is positioned at discrete distances from the fixed wall 12 (based on the positions of the adjustment slots 38). In another embodiment, instead of a pin 40 that engages an adjustment slot 38, a movable wall 14 may be connected to the fixed wall 12 by a continuously variable mechanism such as a clasp that connects it to a link arm.

Determining Interior Width Between Walls

To accommodate a single column of product (assuming a circular product), the ideal distance between the walls will be slightly greater than the product diameter. However, better so-called "pack-out" (the packing of products in a vending machine) may be achieved by having product columns that are two or more products wide.

Figure 8:
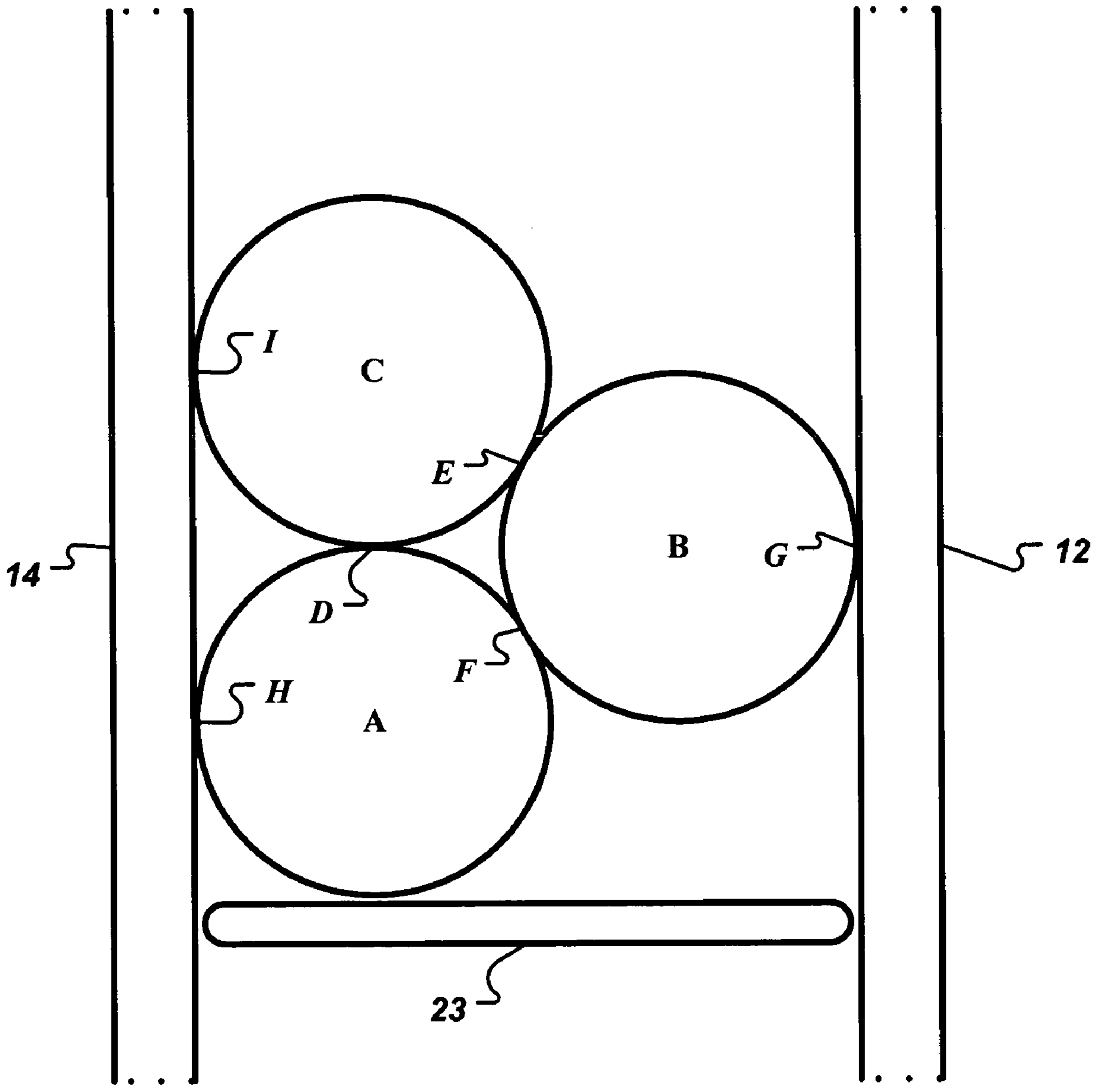
FIGS. 8–9 show how to determine an optimal width between the walls of an adjustable storage rack according to embodiments of the present invention.

In order to make the most efficient use of the space in a stack that is two products wide, the wall spacing should allow each product to be in contact with both the product above and the product below it, as well as with the product diagonally opposite it. An example of such a stack is shown in FIG. 8, where the three products A, B and C are depicted by circles with centers A, B and C. As can be seen in FIG. 8, product A is in contact with product C above it (at contact point D) and with product B diagonally opposite it (at contact point F). Product B is in contact with product C, diagonally opposite it (at contact point E). Product A also touches the wall 14 (at contact point H), product B touches the wall 12 (at contact point G), and product C touches the wall 14 (at contact point I).

In FIG. 8 the products are shown resting on an extractor mechanism 23 which may be an oscillator or any other such mechanism which operates (under control of the vending machine) to extract the bottom-most product of the stack (in this case, product A), for vending.

Figure 9:
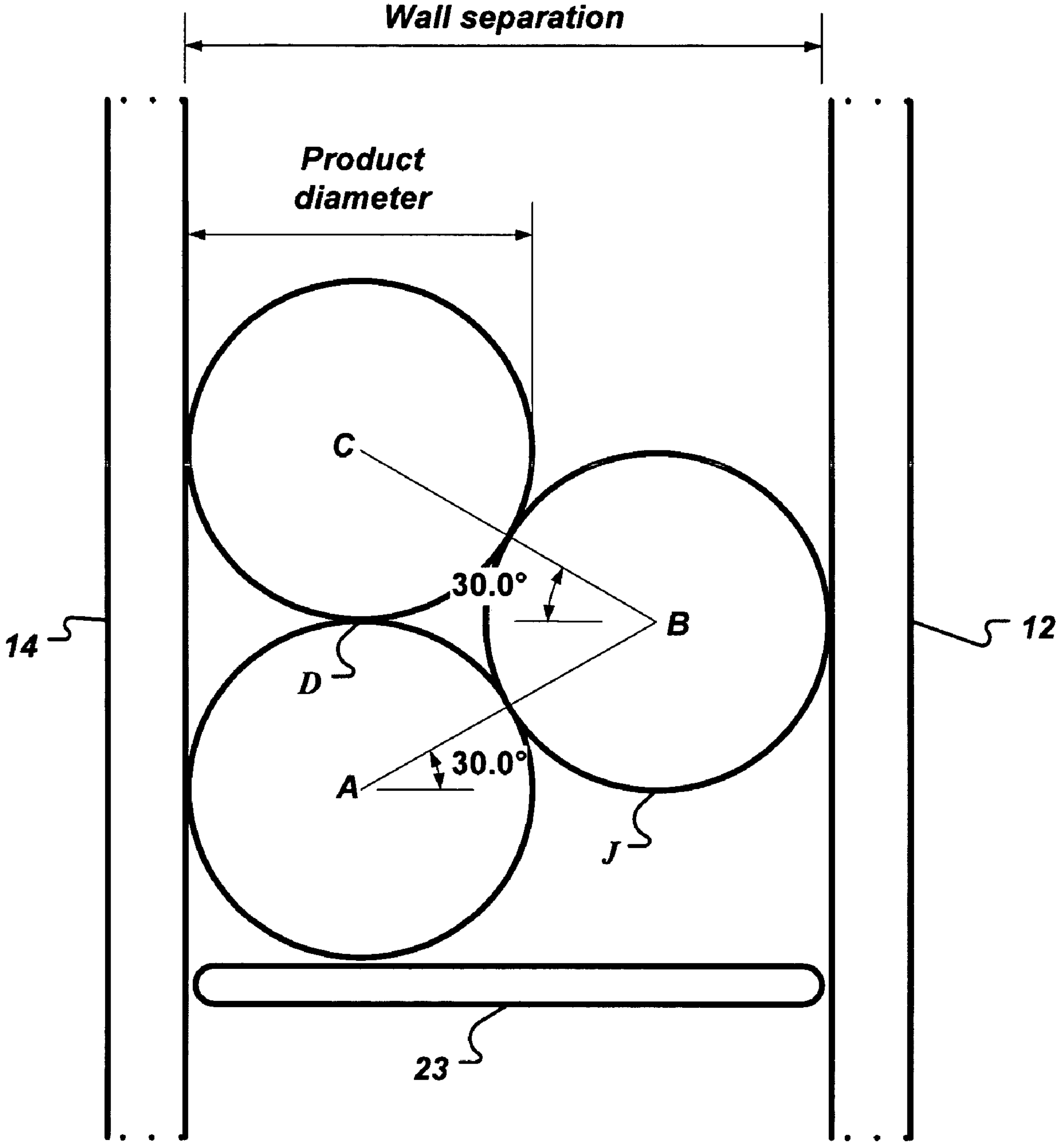

FIG. 9 provides more detail on the optimal packing of a two-wide stack. As shown in FIG. 9, in order to achieve an optimal packing of a two-wide stack, the angle formed by a line joining the centers of two diagonally adjacent products (and the horizontal) should be 30 degrees (assuming that the side walls are vertical). Thus, as shown in the drawing, the angle between the line joining centers A and B and the horizontal (angle JAB) is 30 degrees, as in the angle between the line joining centers B and C and the horizontal (angle DBC).

Note that the wall separation in FIG. 1 is non-optimal since the products 26 are not all positioned as described above. The separation shown in FIG. 2, on the other hand, is much more efficient, with the three soda cans 26 in appropriate contact.

Figure 10:
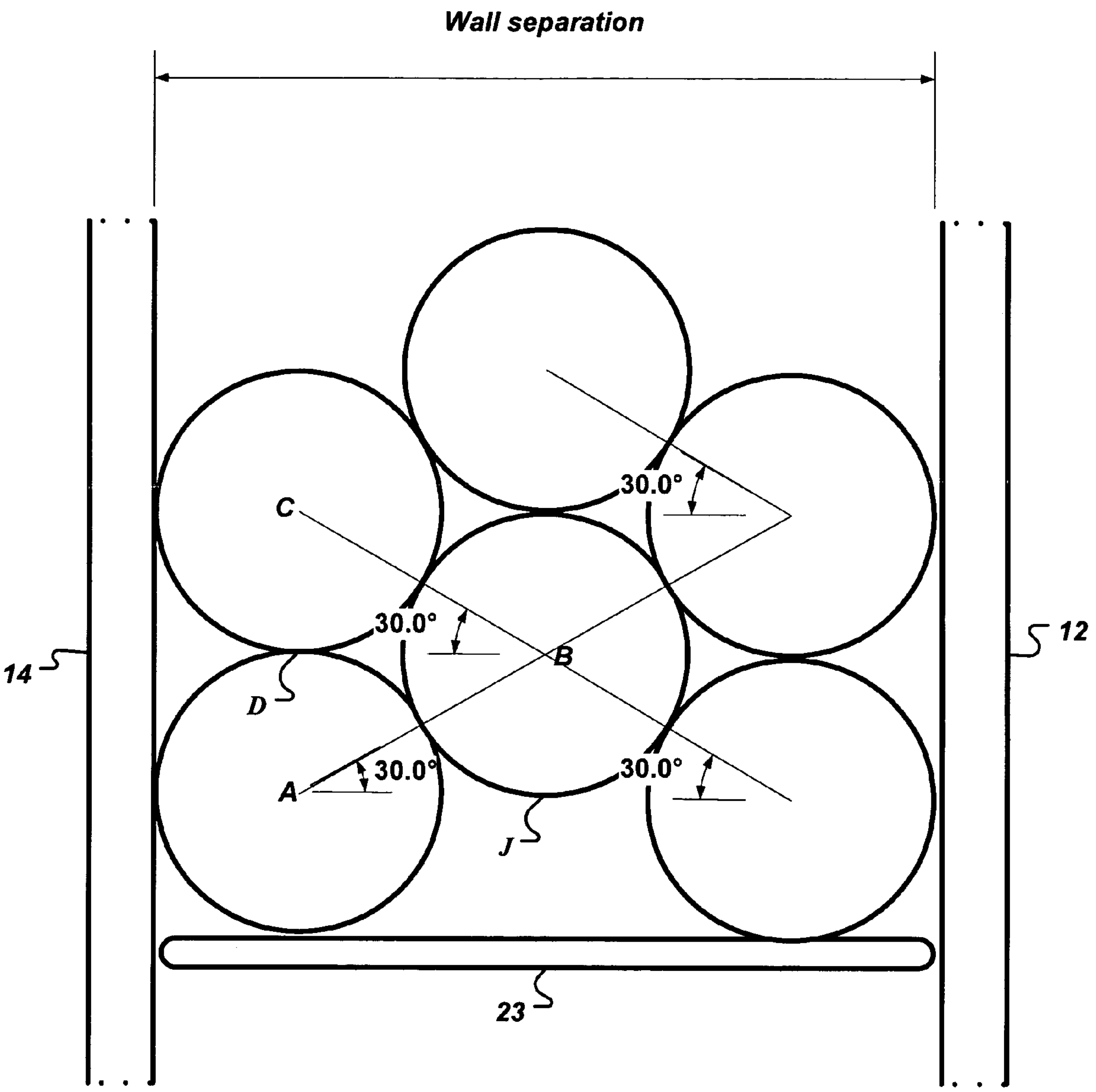
FIG. 10 shows an optimal packing of a three-wide stack.

FIG. 10 shows an optimal packing of a three-wide stack.

In order to achieve the efficient packing shown in FIGS. 8 and 9 for a two-column stack, the internal separation between the walls 12, 14 should be about 1.866 times the diameter of the product to be vended. This wall spacing or separation will allow each product to be in contact with both the product above and the product below it, as well as with the product diagonally opposite it. The top-most product has no other product above it and the lowest product is supported by the oscillator or similar mechanism 23.

In theory, the more columns of product between the two walls, the better (or more efficient) the pack-out. However, it is generally not practical to have a large number of product columns between two walls. One reason for this is that a traditional product stripper (oscillator) might jam with too many columns. Another reason to not have stacks wider than two or three columns is that wide stacks of identical products limit the number of selections available in vending machines.

The following table provides suggested exemplary wall separations for two-column packing of typical products in order to achieve an optimal stacking as described above:

| Product | Approx. diameter in inches | Distance between walls (for two column packing) in inches |
|---|---|---|
| Soda can | 2.6 | 4.85 |
| typical bottle | 2.9 | 5.41 |
| small bottle | 2.12 | 3.96 |

In some embodiments of the adjustable stack, e.g., as shown in FIGS. 6 and 7, the adjustment slots 38 are formed and positioned so as to allow optimal widths for one, two or three column stacks for typical products such as soda cans and/or typical bottles and/or small bottles. Preferably the slots are appropriately marked to allow a user to adjust the column width without measurement. For example, in some embodiments, there are adjustment slots 38 for a single column of soda cans, for a double column of soda cans and for a triple column of soda cans. For a typical soda can having about a 2.6 inch diameter, the first such slot would be about 2.6 inches from the fixed wall and the second such slot (for the two-column stack) would be at about 4.85 inches from the fixed wall. These slot positions are given only by way of example, and one skilled in the art will realize that any slot positions are within the scope of the invention.

One skilled in the art will realize that the actual wall separation should be somewhat wider than the theoretically optimal separation so as to allow for movement of the products. One skilled in the art will also realize that the calculations above are based on products that have a circular cross section such as bottles and cans.

Various aspects of the different embodiments can be combined in different combinations to create new embodiments.

As noted, the adjustable storage racks described in the various embodiments herein are preferably used within vending machines. More preferably, they are used within machines that vend bottles and cans. Since the racks can be adjusted to different widths in the same vending machine, one machine can be used to vend bottles of different sizes and shapes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A vending machine comprising:

at least one width-adjustable storage rack, the storage rack having:

a fixed wall and a movable wall connected to the fixed wall by at least one connecting link;

an adjustment mechanism constructed and adapted to position the movable wall relative to the fixed wall and to thereby vary an interior width between the fixed and movable walls; and an extraction mechanism positioned between the movable wall and the fixed wall, said extraction mechanism constructed and adapted to extract a product from the storage rack for vending, wherein the extraction mechanism is connected to at least one connecting link that connects the movable wall to the fixed wall.

2. A vending machine as in claim 1 wherein the fixed wall is connected to the movable wall by a connecting link pivotally attached to the fixed wall by a first connector and pivotally attached to the movable wall by a second connector.

3. A vending machine as in claim 2 wherein the first connector is selected from the group consisting of: threaded fasteners; pin and clip fasteners; and rivets, and wherein the second connector is selected from the group consisting of: threaded fasteners; pin and clip fasteners; and rivets.

4. A vending machine as in claim 1 wherein the adjustment mechanism is connected to the vending machine and to the movable wall.

5. A vending machine as in claim 4 wherein the adjustment mechanism is a turnbuckle.

6. A width-adjustable storage rack for a vending machine, the storage rack comprising:

a fixed wall and a movable wall connected to the fixed wall by at least one connecting link;

an adjustment mechanism constructed and adapted to position the movable wall relative to the fixed wall and thereby to vary an interior width between the fixed and movable walls, and an extraction mechanism positioned between the movable wail and the fixed wall, said extraction mechanism constructed and adapted to extract a product from the storage rack for vending, wherein the extraction mechanism is connected to at least one connecting link that connects the movable wall to the fixed wall.

7. A vending machine as in claim 1 wherein the connecting link comprises at least one bracket fixedly connected to the fixed wall, each bracket including an adjustment link having spaced apart adjustment slots, each constructed and arranged to receive a pin attached to the movable wall.

8. A vending machine as in claim 7 wherein the connecting link comprises four brackets and wherein four pins are used for each movable wall.

9. A vending machine as in claim 1 wherein at least one fixed wall is connected to two movable walls.

10. A vending machine as in claim 1 having adjustment slots positioned to form single and double column stacks of at least one product to be vended.

11. A vending machine as in claim 10 wherein the products to be vended are soda cans and wherein a first adjustment slot is positioned to form a column having a width of about 2.6 inches and wherein a second adjustment slot is positioned to form a two-width column having a width of about 4.85 inches.

12. In a vending machine, storage racks comprising:

a fixed wall and two movable walls, each connected to the fixed wall by at least one connecting link;

adjustment mechanisms constructed and adapted to position each movable wall relative to the fixed wall and thereby to vary an interior width between each of the two storage racks formed by the fixed and movable walls, and two extraction mechanisms, each positioned in one of the two storage racks formed by said movable walls and said fixed wall, each said extraction mechanism being constructed and adapted to extract a product from an associated storage rack for vending, wherein at least one of the two extraction mechanisms is connected to a connecting link that connects one of the two movable walls to the fixed wall.

13. A method of adjusting an interior width of a storage rack for a vending machine, the method comprising:

providing a fixed wall and a movable wall connected to the fixed wall by at least one connecting link;

moving the movable wall relative to the fixed wall to vary the interior width between the fixed and movable walls until an appropriate width is reached; and positioning an extraction mechanism between said fixed wall and said movable wall, said extraction mechanism being constructed and adapted to extract a product from the storage rack for vending, wherein the extraction mechanism is connected to at least one connecting link.

14. A method as in claim 13 wherein the vending machine vends bottles of a certain diameter and wherein the appropriate width is one which allows the bottles to be stacked within the rack.

15. A method as in claim 14 wherein the appropriate width is one which allows a two-column stack of products within the rack.

16. A method as in claim 14 wherein the products are soda cans and wherein the width is approximately 4.85 inches.

17. A vending machine as in claim 1 wherein the extraction mechanism comprises an oscillator for extracting the lowest product in the storage rack.

18. A storage rack as in claim 6 wherein the product extraction mechanism comprises an oscillator for extracting the lowest product in the storage rack.

19. A vending machine as in claim 1 wherein the extraction mechanism is constructed and adapted to extract and vend the lowest product in the storage rack.

20. A vending machine as in claim 17 wherein the oscillator is kept approximately centered in the rack regardless of the spacing between the fixed wall and the movable wall.

* * * * *